INVENTORS
MELVIN F. GEORGE JR.
ELI SIMON
EDWARD H. BURKART
By George C. Sullivan
Agent Feb. 26, 1963  M. F. GEORGE, JR., ET AL  3,079,289
HIGH DIELECTRIC CONSTANT MATERIAL AND METHOD OF MAKING SAME
Filed Nov. 1, 1955  2 Sheets-Sheet 2

INVENTORS
MELVIN F. GEORGE JR.
ELI SIMON
EDWARD H. BURKART
By George C. Sullivan
Agent United States Patent Office 3,079,289
Patented Feb. 26, 1963

3,079,289
HIGH DIELECTRIC CONSTANT MATERIAL AND METHOD OF MAKING SAME
Melvin F. George, Jr., North Hollywood, Eli Simon, Los Angeles, and Edward H. Burkart, North Hollywood, Calif., assignors to Lockheed Aircraft Corporation, Burbank, Calif.
Filed Nov. 1, 1955, Ser. No. 544,238
9 Claims. (Cl. 154—43)

This invention relates, generally, to dielectric materials and, more particularly, to a low density, artifically prepared high dielectric constant material and method of making the same in which any desired dielectric constant within reasonable limits may be obtained. The material is, in the main, described herein as radome core material, though obviously it may be used to advantage and without departing from the teachings of this invention in most any application calling for a material having a high dielectric constant.

The presently available material for constructing minimum beam distortion, low loss radomes having a needle nose or sharp leading edge configuration such as are required on high speed aircraft is a solid Fiberglas-polyester laminate which is a high density material and unsatisfactory from a weight standpoint. This is particularly evident with fighter aircraft where a decrease in weight at times becomes mandatory due to lower fuel consumption rates together with the requirement for long range operation.

The severe weight penalty imposed by the use of solid Fiberglas laminates as radome material for aircraft may be avoided on slower, subsonic aircraft which will accommodate blunt leading edge or low aspect radome configurations wherein the angle, commonly referred to as the incidence angle, between the direction of energy propagation and a line normal to the radome at the point of intersection, is low. In such radome configurations it is possible to use a sandwich construction in lieu of the solid Fiberglas-polyester laminates. The sandwich construction is usually a low dielectric constant, low loss honeycomb cellular core interposed between outer skins of higher dielectric constant Fiberglas laminate. This construction has a relatively low density and is electrically efficient so long as the angle of incidence of the energy beam with respect to the radome is low. As the incidence angle increases, however, transmission efficiency decreases and beam distortion becomes more severe. At the higher incidence angles introduced by the streamlined radome configurations which are used on high speed aircraft, the non-homogeneous sandwich construction is electrically unsatisfactory and the solid Fiberglas type radome construction must be employed according to the prior art teachings even though it is inefficient weightwise.

An object of this invention is to provide an artificially prepared high dielectric constant material which is electrically homogeneous so that it may be employed in radomes for high speed aircraft, or the like, at a considerable savings in weight as compared with the use of solid Fiberglas-polyester laminates and yet exhibit substantially the same electrical properties and efficiency. There is substantially no increase in losses or change in dielectric constant due to changes in the angle of incidence with the material of this invention.

Another object of this invention is to provide an artificially prepared high dielectric constant material of low density in which any desired dielectric constant within reasonable limits may be obtained. There are various advanced radome designs that are more effective with a dielectric constant of 2, or 6, or 8, instead of the customary 4 obtained with the Fiberglas-polyester laminates. This invention enables such radomes to be tailor-made in accordance with the design requirements for a specific dielectric constant and in a controllable manner. This is not true of the materials normally used in radome construction. The Fiberglas-polyester laminate commonly used exhibits a dielectric constant of approximately 4 which is not variable to any substantial degree.

Another object of this invention is to provide an artificially prepared high dielectric constant material which exhibits a low loss tangent or dissipation factor favorably comparable with that of the Fiberglas-polyester laminate.

Another object of this invention is to provide an artificially prepared high dielectric constant material which is substantially insensitive to frequency over a range of zero to 10,000 megacycles or more with regard to either the dielectric constant or dissipation factor.

Another object of this invention is to provide an artificially prepared high dielectric constant material and method of making the same in which the desired dielectric constant may be obtained in an easily controlled manner so that in production, different batches of the material may dependably exhibit substantially identical electrical properties.

Another object of this invention is to provide an artificially prepared high dielectric constant material which is stable over a wide temperature range.

Another object of this invention is to provide a material, the dielectric constant of which may be readily varied with substantially no change in weight.

Still another object of this invention is to provide an artificial high dielectric constant material which may be molded to any desired shape or configuration without the use of heavy equipment. No pressure is required or developed in practicing the method.

Further and other objects will become apparent from a reading of the following description of typical preferred embodiments in which reference will be made to the accompany drawings wherein.

Figure 1:
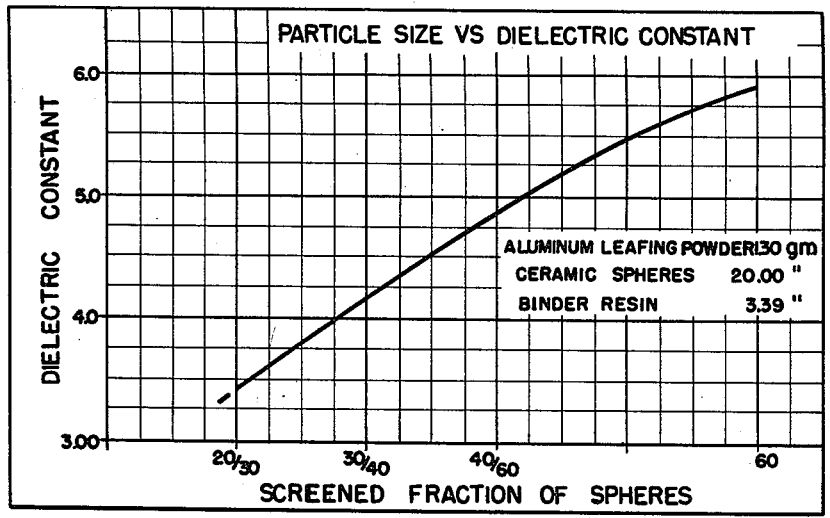
FIGURE 1 shows graphically the variation in dielectric constant obtainable by varying the particle size of the pellet constituent of the dielectric material.

The invention concerns artificially prepared high dielectric constant materials and its method of preparation which involves the external application of finely divided metal leafing powders to nominally low dielectric constant materials. The range of the dielectric constant obtainable is approximately 1.8 to 9 when a hollow or internally porous spherical core material is used. This range is considered adequate for all practical purposes; however, the low end can be reduced to approximately 1.2 if desired by using either organic spheres or lower density inorganic materials. Prior to coating, the spheres are essentially in their final state of density; they are preferably light in weight and may exist in various stages of subdivision from less than 0.0001 inch to more than 0.125 inch diameter but preferably from .0002 inch to 0.060 inch diameter. The spheres may vary considerably in composition from organic to inorganic, it being preferred however, that the outer surface be relatively non-porous to facilitate coating.

The spheres which serve as the lightweight matrix in the composition may be selected from the following list, which is intended to be illustrative only.

(1) Expanded montmorillonite (a principal constituent of bentonite and fuller's earth).

(2) Expanded montmorillonite internally pigmented with dielectrically modifying agents such as titanium dioxide, iron oxide, calcium oxide, and barium titanate.

(3) Expanded resins such as phenolics, epons, polyurethanes, and polystyrenes.

(4) Expanded silicates such as the sodium, potassium silicates, or their mixtures with and without modifying constituents.

(5) Expanded or lightweight oxides such as $Al_2O_3$, and $SiO_2$.

While much work on the artifical high dielectric constant materials has involved two ceramic hollow sphere materials, it was shown that other materials of similar size and shape could be utilized. Some work using acrylic molding powder such as a compressive molding grade of methylmethacrylate resin indicated that the resulting dielectric constant is not dependent on the raw material of the sphere. Similar results were obtained using a spherical lotus seed. Thus, the spherical pellets which serve as the filler or matrix in the composition are not limited to any one material or type of material but rather to an approximate shape. Actually, all the particles are not perfect spheres but all would be considered approximately spherical.

The apparent density of the spherical pellets is of interest in aircraft applications, but it is not a controlling factor in obtaining a desired dielectric constant. Pellet size however, does affect the resulting dielectric properties. For practical reasons a sphere diameter ranging between .010 inch and .025 inch is preferred. This corresponds approximately to a 30–60 mesh screen fraction. While the above sphere size is preferred it is possible to successfully dielectrically modify particles as small or smaller than .0002 inch diameter or above .064 inch diameter.

The preferred material for the spherical pellets employed in this invention is prepared from suitable clays such as montmorillonite wherein the clay is ground, screened, suspended in air and fired by mixing with gas and burning. Simultaneous expansion and glazing of the clay particles occurs to form spherical, lightweight, hollow or internally porous glazed balls suitable for metal coating. Such a unicellular spherialized clay product is produced by the Kanium Corporation, for an example, under the trade name "Kanamite."

Metallic pigments which are plate-like are most suitable for coating and dielectrically modifying the spherical pellets. Among these are aluminum leafing powder, copper bronzing powders and other materials such as zinc, stainless steel, etc. Particle size is important as well as particle shape. From experimental work it has been shown that the effectiveness of the addition of metallic leafing powders to the matrix spheres is related to the vloume and number of platelets added and not weight (where materials of different densities are being compared). An extra fine 400 mesh aluminum leafing powder commercially identifiable as (MD7100) having an approximate major dimension of .0004 inch and an approximate thickness of .000005 inch is preferred for coating the pellets though other metal powders and other particle sizes and shapes will produce good results.

Various resinous binders for applying the metal leafing powder to the spherical pellets and for cementing the pellets together have been successfully used, among which are the following: Epoxies, polyesters, polystyrene, styrene-polyesters, silicones, etc. Likewise, it is feasible to utilize inorganic binders in order to extend the thermal properties of the artificial dielectric material.

Silicone resins are particularly efficacious in formulating the dielectric material. These binders are stable at temperatures as high as 600° F. with substantially no changes occurring in either the physical or electrical properties.

As a matter of convenience, blends of resins may be used in binding the pellets and metal leafing powder, i.e., the precoating procedure as hereinafter described, may use epoxies with a secondary binder of silicones or vice versa.

In general, the type of binder resin does not significally influence the resulting dielectric constant obtained from a given formulation of metal powder, spherical pellets and resins. It should be noted however, that the technique of applying the metal leafing powder is significant in that it influences the dielectric constant and radar loss characteristics of the material.

While the resin serves primarily as a binding medium and as stated above, does not as a general rule significantly influence the dielectric constant, the silicone resin binders are exceptions. These materials with equivalent metal-pellet ratios, produce dielectric constants somewhat higher than when other types of resin binders are employed. This is graphically illustrated in FIGURE 2.

Three basic methods for preparing the artificial dielectric material from the metal powder, pellet and resin components have been used—all successfully. These procedures are listed as follows:

(1) Batch mixing using liquid resin binder—such as "epoxies," polyesters, etc.

(2) Precured-precoated pellets mixed with liquid resin or resin solution and compacted and cured.

(3) Precured-precoated pellets coated with a second resin which may be a non-tacky solid at ordinary temperatures but when heated, will fuse and cure. In this class fall certain epoxy, phenolic, polyester, silicone, etc., resins.

Preparation of controlled dielectric core material may be accomplished in single or multiple step operations. For example, in a single step operation, a weighed amount of the expanded ceramic material or pellets may be mixed directly with the metal pigment and binder resin and after a thorough mixing the mixture may be packed between Fiberglas laminates, free to form blocks or in any other suitable manner and then cured. The curing condition will depend on the binder resin and catalyst used. It is possible to have either room temperature or heat curing compositions.

Figure 2:
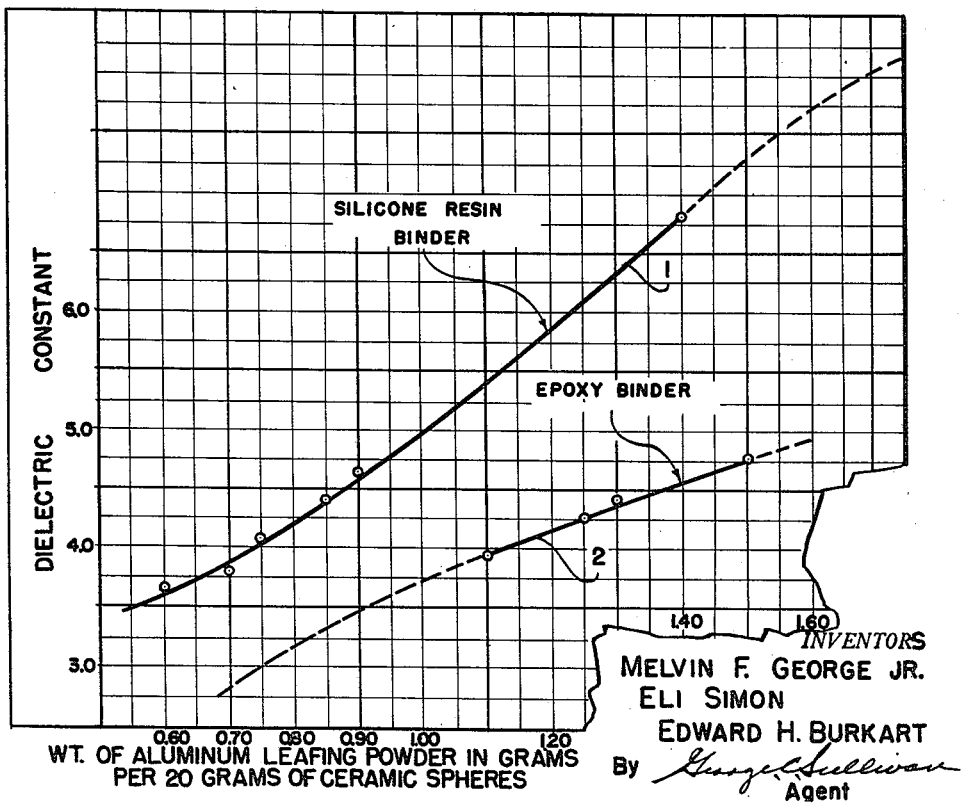
FIGURE 2 shows graphically the effect of two different binding resins on the dielectric constant of the material.

A multiple step operation may be desirable in using the dielectric material wherein the pellets are precoated with a minimum of binder resin together with the desired amount of metal leafing powder and then thoroughly mixed, preferably with sufficient solvent to permit uniform coating of each particle. Then, after the excess solvent has evaporated, the coated pellets are cured. At this stage the material can be carefully checked for electrical properties and used either as a dry pack or mixed with more of the same, or different, binder resin to prepare compacted core material of substantially the same electrical properties as the pre-coated, pre-cured pellets. An exception should be noted here however when silicone resins are used as the binder. As hereinabove mentioned, and as illustrated in FIGURE 2, such resins appear to have a definite secondary effect in increasing the dielectric constant. Therefore, this effect must be taken into account when using the silicone resins, to dependably produce a dielectric material having the desired electrical properties.

It has been found advantageous to incorporate a small amount of solvent during the mixing operation to facilitate coating of the metal leafing powder on the ceramic pellets. This solvent may be removed prior to packing the material, or if desired, it may be left in the mixture to help handling and packing.

In order to obtain intermediate dielectric constants from pre-coated preparations as obtained from using the multiple step method, it is possible to blend various batches together. Also, it has been found useful to blend pre-coated batches with the uncoated pellets or with the metal leafing powder and binder resin or with mixtures thereof to obtain intermediate dielectric constant material. This blending permits close control with regard to the electrical characteristics of the final product. Where identical final compositions are used, the dielectric constant of the material produced is essentially the same regardless of the method by which the ingredients are mixed.

The effect of pellet size on the dielectric constant of the final product using a fixed ratio by weight of aluminum leafing powder, pellets and resin is graphically illustrated in FIGURE 1. As is apparent from this figure, the dielectric constant increases almost linearly with a decrease in the size of the spherical pellets up to a point at which the pellet size exceeds a mesh screen fraction of approximately 60 (this corresponds to a pellet diameter of approximately .010 inch), at which point a further decrease in the pellet size becomes less effective in increasing the dielectric constant.

The increase in dielectric constant due to increasing the concentration of metal leafing powder is shown by FIGURE 2. Curve 1 in FIGURE 2 represents a mixture employing a silicone resin binder while curve 2 represents a mixture employing an epoxy resin binder commercially identified as Epon 828. Equivalent amounts of binder resin were used for a given weight of pellet and metal leafing powder in developing curves 1 and 2. From this figure it is readily apparent that the silicone resins are the preferred binder since it adds to the effectiveness of the metal leafing powder in producing any desired dielectric constant within a relatively wide range.

Examples of specific mixtures of pellets, metal leafing powder and binder resins are listed hereinbelow together with the resulting dielectric constant of each mixture.

*Example I*

| | Grams |
|---|---|
| Expanded ceramic (montmorillonite) pellets (20–80 mesh) | 20.00 |
| Extra fine 400 mesh aluminum leafing powder (MD7100), approx. major dimension .0004 inch, approx. thickness .000005 inch | 2.00 |
| Epon 828 binder resin | 5.65 |

This mixture resulted in producing a dielectric constant of 4.9. By reducing the weight of the leafing powder in the above mixture to 1.50 grams and the weight of the binder resin to 3.39 grams, a dielectric constant of 4.2 was obtained.

*Example II*

| | Grams |
|---|---|
| Expanded ceramic (montmorillonite) pellets (20–80 mesh) | 20.00 |
| Large particle aluminum leafing powder (140M) having an approx. major dimension of .0012 inch and an approx. thickness of .00003 inch | 2.00 |
| Epon 828 binder resin | 5.65 |

This mixture resulted in producing a dielectric constant of 3.95. By increasing the weight of the leafing powder in the mixture to 4 grams, the dielectric constant increased to 5.81.

*Example III*

| | Grams |
|---|---|
| Expanded ceramic (montmorillonite) pellets (20–80 mesh) | 20.00 |
| Copper-bronze leafing powder (comparable volume to 1.30 grams of aluminum) | 4.00 |
| Epon 828 binder resin | 3.39 |

This mixture resulted in producing a dielectric constant of 3.89. As is apparent by comparing Example III with Examples I and II the aluminum leafing powder is more effective in producing a high dielectric constant material than is the copper-bronze leafing powder when compared on a weight basis. When compared on a volume basis however, there appears to be little difference between leafing powders.

*Example IV*

| | Grams |
|---|---|
| Pellets of acrylic molding powder (30–40 mesh) | 22.20 |
| Aluminum leafing powder (MD7100) | 1.30 |
| Epon 828 binder resin | 3.40 |

This mixture produced a dielectric constant of 4.6. Note that the pellet material here is different from that used in the first three examples, though of substantially the same mesh screen fractions.

*Example V*

| | Grams |
|---|---|
| Lotus seed pellets (20–30 mesh) | 40.00 |
| Aluminum leafing powder (MD7100) | 1.30 |
| Epon 828 binder resin | 3.40 |

This mixture produced a dielectric constant of 4.9. It should be noted that 40 grams of the lotus seed pellets is comparable in volume to approximately 20 grams of the expanded ceramic pellets.

The above examples serve to not only illustrate typical mixtures on a quantitative basis but they also help to support the facts brought out hereinabove wherein the dielectric constant obtainable is substantially independent of the pellet material while being largely dependent on pellet size and the kind and amount of metal leafing powder used.

Figure 3:
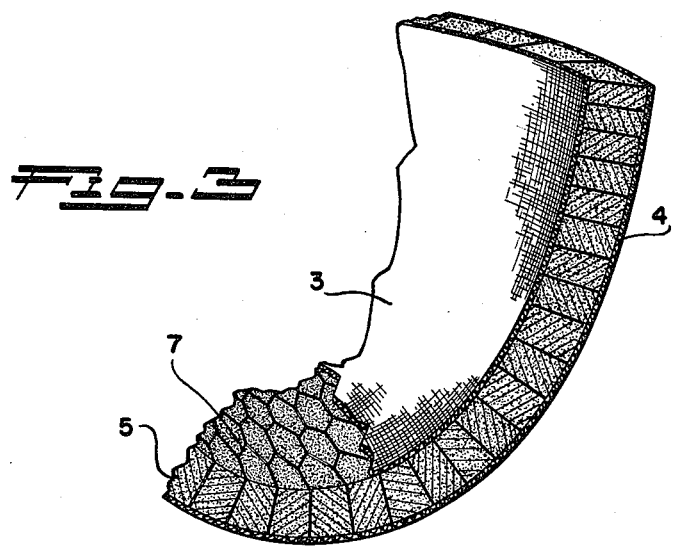
FIGURE 3 is a fragmentary view illustrating a sandwich type radome construction incorporating the artificial dielectric material of this invention.
Figure 4:
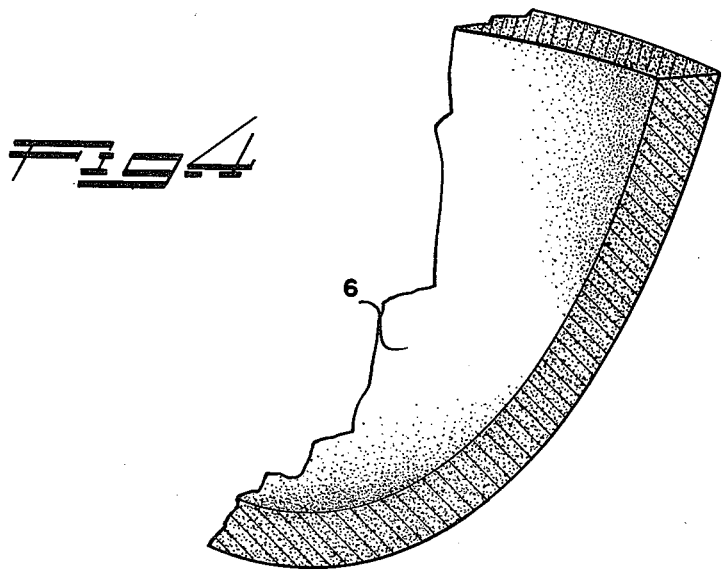
FIGURE 4 is a fragmentary view of a radome molded entirely from the artificial dielectric material of this invention.

An important feature of the artificial dielectric constant material is the relative ease with which it may be handled and molded into a desired configuration. When using the material in radomes it may be poured into the open cells of a honeycomb core 7 of paper, or the like, which is interposed between outer skins 3 and 4 of Fiberglas-polyester laminate material as shown in FIGURE 3. After the high dielectric constant material is poured in place, it is cured to form a lightweight, high strength radome structure 5. The artificial material having homogeneous electrical properties allows the panel structure to act electrically as a solid Fiberglas-polyester laminate structure while being much lighter in weight. Also, any desired dielectric constant within reasonable limits may be obtained.

Where the strength requirements will permit, the part such as radome 6 illustrated in FIGURE 4 may be made entirely of the artificial high dielectric constant material or the sandwich type construction of FIGURE 3 may be employed without the use of the cellular reinforcing core.

While certain preferred embodiments of the invention have been described herein and while examples of specific mixtures have been given, it is entirely for purposes of illustration rather than limitation. Accordingly, it should be understood that many alterations, modifications and substitutions may be made to the instant disclosure without departing from the spirit and scope of this invention as defined by the appended claims.

We claim:

1. A low density, high dielectric constant radome material through which electrical energy may be efficiently transmitted comprising, a plurality of pellets of dielectric material, said pellets being generally spherical in shape and having an average diameter greater than 0.0001 inch and less than .125 inch, a metal coating surrounding each said pellet, and bonding means securing said pellets to said metal coating and to each other forming a unitary structure.

2. An artificial, low density, high dielectric constant material comprising, a plurality of low density expanded ceramic pellets, said pellets being generally spherical and having an average diameter greater than 0.0001 inch and less than .125 inch, a metal leafing powder surrounding each said pellet, and bonding means securing said pellets to said metal leafing powder and to each other forming a unitary structure.

3. An artificial, high dielectric constant material comprising, a plurality of generally rounded pellets of dielectric material, said pellets having an average diameter greater than 0.0001 inch and less than .125 inch, a metal leafing powder coating said pellets, and bonding means securing the metal and pellets together.

4. An artificial, high dielectric constant material comprising, a plurality of generally rounded pellets of dielectric material, said pellets having an average diameter greater than 0.0001 inch and less than .125 inch and being more dense on the outside than on the inside, a metal powder for coating said pellets, and bonding means securing the metal powder to said pellets.

5. A method of making artificial, high dielectric constant material comprising, mixing a plurality of generally rounded pellets of dielectric material together with metal leafing powder and a suitable bonding agent, and curing the bonding agent to cause said leafing powder to adhere to said pellets.

6. A method of making a low density, high dielectric constant material comprising, grinding a quantity of clay into small particles, firing said clay particles by mixing the same with gas and burning whereby a plurality of generally rounded, internally porous glazed pellets are produced having an outer surface suitable for metal coating, mixing a quantity of metal powder with said pellets, and adding a bonding agent to cause said powder to adhere to the surface of said pellets.

7. An artificial, low density, high dielectric constant material comprising, a plurality of low density expanded ceramic pellets, said pellets being generally spherical and having an average diameter greater than 0.0001 inch and less than .125 inch, a metal leafing powder surrounding each said pellet, and bonding means securing said pellets to said metal leafing powder.

8. The process of preparing a filler comprising coating thin-walled hollow beads with a powdered metal and a thermosetting resin.

9. A filler comprised of thin-walled hollow beads coated with and intermingled with powdered metal and a thermosetting resin.

References Cited in the file of this patent
UNITED STATES PATENTS

| | | |
|---|---|---|
| 1,818,070 | Lathrop | Aug. 11, 1931 |
| 1,867,661 | Freeman | July 19, 1932 |
| 1,867,797 | Armstrong | July 19, 1932 |
| 1,874,922 | Delaney | Aug. 30, 1932 |
| 2,010,133 | Bloomenthal | Aug. 6, 1935 |
| 2,033,656 | Smith | Mar. 10, 1936 |
| 2,136,096 | Brenner et al. | Nov. 8, 1938 |
| 2,332,220 | Harshberger | Oct. 19, 1943 |
| 2,644,772 | Kaye | July 7, 1953 |
| 2,732,311 | Hartwright | Jan. 24, 1956 |
| 2,761,854 | Coler | Sept. 4, 1956 |
| 2,837,772 | Deakin | June 10, 1958 |

OTHER REFERENCES

Journal of the Electrochemical Society, October 1951, pages 385–387.